3,223,621
OIL WELL DRILLING FLUID
SPOILAGE INHIBITORS
Bernard Marlowe, Broomall, Pa., Richard L. Raymond, Wilmington, Del., and John D. Douros, Jr., West Chester, Pa., assignors to Sun Oil Company, Philadelphia, Pa., a corporation of New Jersey
No Drawing. Filed Jan. 15, 1962, Ser. No. 166,360
5 Claims. (Cl. 252—8.5)

This invention relates to certain aromatic additives useful in preventing the growth of microorganisms in well drilling fluids.

More particularly, this invention concerns certain di-substituted naphthalenes, their salts and derivatives which when added in small quantities to well drilling fluids prevent or inhibit the microbiological spoilage of drilling fluid additives.

These di-substituted inhibitors have the structure:

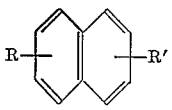

wherein R and R', which may be the same or different, are substituents selected from the group consisting of alkyl, hydroxyalkyl, alkoxy, formyl, hydroxy, carboxy, the alkyl esters of carboxy, and the salts of carboxynaphthalene, said alkyl, hydroxyalkyl, alkoxy, and carboxy substituents having from 1 to 6 carbon atoms.

Examples of inhibitors intended to be within the scope of this invention include among many others the dialkylnaphthalenes such as 1,2-dimethyl- and 1,6-diethylnaphthalenes, alkyl naphthols such as 6-methyl-2-hydroxynaphthalene, dihydroxynaphthalenes such as 1,8-dihydroxy- and 1,4-dihydroxynaphthalenes, mono- and dialkoxynaphthalenes such as 5-methoxy-1-hydroxynaphthalene and 1-methoxy-1-naphthoic acid, formyl compounds such as 6-formyl-2-naphthoic acid, mono- and dicarboxynaphthalenes such as 1,3-dicarboxynaphthalene and 3-hydroxy-2-naphthoic acid, esters of carboxynaphthalene such as the 6-formyl-2-methyl naphthoate, as well as the carboxy salts of the naphthalenes.

It has been commonplace for some time in drilling oil and gas wells by rotary tool methods, to circulate a drilling fluid known in the art as "drilling mud" down through the drill pipe and bit and return it through the earth boring.

The drilling fluid when properly circulated and formulated serves several beneficial and important purposes, including lubrication of the drill pipe, cooling the bit, carrying the cuttings out of the hole to the surface, and sealing and holding the penetrated formation in place to prevent crumbling and collapse. Another important function of the drilling mud is preventing gas and other fluids under high pressure from escaping from the penetrated formations into the bore hole. For this purpose the drilling fluid should have sufficient viscosity to prevent the entrance of these fluids under pressure into the bore hole. However, the viscosity should be sufficiently low so that upon agitation the mud is readily pumpable and cuttings and sand will settle out in the settling pits. Ideally, these fluids should have good thixotropic properties.

Still another important property of the drilling mud or drilling fluid is its filtration characteristics. That is, the ability of the drilling fluid to "plaster out" on the borehole wall and form a filter cake with a maximum amount of water loss. If the water loss is high a thick filter cake will be formed on the wall of the borehole and may cause the drill pipe to stick. A drilling mud which has a minimum water loss will prevent sticking of the drill pipe by reducing the tendency of the shale to swell and slough off. Thus low water loss is a desirable characteristic of drilling muds.

Unfortunately, natural field muds fail to meet all these physical requirements and are unsatisfactory. For this reason, it has been the custom for some time to use additives which impart the desirable physical characteristics to the drilling fluid whether it be an aqueous-based mud, an oil-based mud, or a drilling emulsion, either oil in water, or water in oil.

Among the many additives which have been proposed or used are included the silicates, bentonites, sugar cane fibers, sawdust, diatomaceous earths, hematites, barites, sugar, gums, glutens, starches, and more recently the celluloses or the synthetically modified cellulose materials such as the carboxy-alkyl celluloses. Since huge quantities of drilling muds are required and cost is a prime factor, every effort is made to use low-cost thixotropic materials as drilling mud additives. Thus the natural waste materials such as modified celluloses, soaps, gums, and starches have come into widespread use to prevent water loss and keep the physical characteristics of the mud within the desired limits. These latter additives, the starches, gums, and carboxyalkylcelluloses, are particularly valuable where drilling is done in sea water, brines or any other situation where high salt concentrations are encountered. The reason for this is that the bentonite type clays which are ordinarily used as gelling agents, fail to hydrate in salt water and are ineffective to prevent water loss to the formation. As indicated, loss of water from the drilling fluid to the formation walls drastically impairs the beneficial characteristics of the drilling fluid and must be avoided for trouble-free operation. The current feeling in the art is that water loss, as well as changes of viscosity in the drilling fluid, are actually early manifestations of attack by microorganisms. These changes occur prior to the time that spoilage of the drilling mud additives is evidenced by odor and discoloration.

Unfortunately, the starches or starch-like materials, the gums, the celluloses, and the modified celluloses being largely carbohydrates are especially prone to microorganism attack. Among the many microorganisms found in gas and oil wells which attack these drilling additives are Aspergillus and Pseudomonas, as well as many other unidentified bacteria, yeasts, and fungi. Even the oil-based drilling fluids are not immune since they frequently utilize soaps derived from fatty acids as well as hydrocarbon oils. Recent evidence indicates that these soaps and perhaps the oils themselves are subject to microorganism attack. This attack by the microorganisms results in alteration of the mud viscosity and other physical properties and is evidenced by the disagreeable odors evolved as well as the "souring" or blackening of the mud itself.

Efforts to use starches less susceptible to microorganism attack or to use other starch substitutes have largely failed. For example, there have been reports that the lower substituted carboxyalkylcelluloses are easily deteriorated by microbiological attack. Prophylactic measures that have been successfully used include keeping the pH of the drilling mud above 12 and keeping a high concentration of electrolytes (10–15%) in the mud. While these measures are occasionally efficacious for this purpose, they are difficult and expensive to maintain and sometimes impart undesirable characteristics to the mud. Surprisingly enough, the commonly accepted bactericidal agents and preservatives such as bichloride of mercury, copper sulfate, and quaternary ammonium compounds have been found unsatisfactory and other agents more potent than these are prohibitively expensive for field use. It is, in fact, well documented that several complicating factors not ordinarily present in laboratory screening or testing of microbiological growth-inhibitors, make it almost impossible to predict whether a given inhibitor which is effective in the laboratory will be of any value in the drilling fluid being used in the field. Among these factors are the huge number of different bacteria, fungi, algae, yeasts, and the like which may be found in different oil wells, and the sheltered environment of the microorganisms. The former factor means in practical terms that a given inhibitor has to have a broad spectrum of activity against a variety of microorganisms including fungi, bacteria, yeasts, algae, and the like. Most commercially available inhibitors are highly specific in their activity against one particular genus of bacteria or fungi or active against bacteria alone or fungi alone. The second factor, environment, is ordinarily overlooked in the selection of inhibitors. Many microorganisms are extremely adaptable to changes of environment caused by the addition of inhibitors or chemicals generally. Furthermore, they are able to survive in minute sheltered areas of the well where some obstruction or hole is available that acts as a physical barrier to the entry of the inhibiting chemical. This minute sheltered environment is referred to by microbiologists as a microenvironment. It is a very small portion of the treated area where conditions are suitable for the sustenance and growth of the organism. Another problem is that with frequent or continuous use, many microorganisms acquire resistance to biocides that were originally successfully used.

Thus, an advantage of the inhibitors of this invention in contrast to the prior art is that they are effective in low concentrations against a broad spectrum of microorganisms. These include a variety of fungi, actinomycetes, yeasts, algae, bacteria, and the like. An additional advantage of these inhibitors is that depending upon substituents, they are soluble in water-based and oil-based drilling fluids. In addition, they may be incorporated in oil-in-water or water-in-oil emulsion type drilling fluids.

Another advantage of these inhibitors is their low cost and ease of preparation. All of the mono- and di-hydroxy, hydroxyalkyl, carboxynaphthalenes and their esters are well known compounds whose preparation and properties are presented among other places in Chemical Abstracts and in the exhaustive review by Donaldson, entitled "The Chemistry and Technology of Naphthalene Compounds," published in London, E. Arnold, 1958. Most of the salts are well known or are prepared by adding a slight excess over the stoichiometric amount of the base in water, ethanol, or acetone, to a solution of the acid- or hydroxy-naphthalene in water, ethanol, acetone, or a mixture of these solvents. The esterifications and alkylations are identical to well known synthetic organic procedures.

An additional advantage of these microorganism inhibiting compositions is that because of their high activity at low concentrations, very little inhibitor need be added to the drilling mud. Thus, they need not affect the viscosity and thixotropic characteristics of the mud as the high concentrations of electrolytes do.

An additional advantage of these compositions is their ease of formulation through the use of the appropriate compound, derivative, or salt. For example, in oil-based muds subject to microbiological attack, oil-soluble compounds are desirable. Thus compounds such as the disclosed dimethyl or diethylnaphthalenes are particularly efficacious, readily available and of low cost. Similarly, the butyl, amyl, and hexyl esters and amides of the mono- and dinaphthoic acids are eminently suitable for use in oil-based drilling muds. Thus the preferred compositions of this invention, wherein oil-based drilling muds are to be protected by microbiological attack, are the oil-soluble composition of this invention as exemplified by the above representative list.

On the other hand, since the inhibitory effect of these inhibitors is derived from the di-substituted naphthalene moiety, the particular salt used is immaterial except from the standpoint of convenience. Thus all of the salts of the mono- and dinaphthoic acids possessing the requisite minimum water solubility and low cost are equally satisfactory for use in aqueous based drilling muds. Illustrative satisfactory metallic salts are the sodium, potassium, lithium, ammonium, and like salts, as well as the substituted ammonium salts. Examples of suitable substituted ammonium salts include mono-, di-, tri- and tetraalkyl ammonium such as methylammonium, ethylammonium, amylammonium, decylammonium, stearylammonium, dimethyl-, diethyl-, dipropyl, dibutyl-, diamyl-, dioctyl-, didecyl-, distearylammonium, trimethyl-, triethyl-, tripropyl-, tributyl-, triamyl-, trioctyl-, trilaurylammonium, mono-, di-, and trialkanolammonium, including mono-, di-, and triethanolammonium, propanolammonium, butanolammonium, tetraalkylammonium, including tetramethylammonium, trimethyl - (2-chloroethyl) ammonium, trimethyl - (2 - hydroxyethyl) ammonium, also anilinium, N-methylanilinium, N,N-dimethylanilinium, pyridinium, N-laurylpyridinium, N-cetylpyridinium, morpholinium, N-methylmorpholinium, piperazinium, benzylammonium, cyclohexylammonium, hydrazinium, hydroxammonium, and the like.

Thus the preferred composition of this invention where water-based muds are to be protected from microbiological attack are the salts of the naphthoic acids and hydroxy naphthoic acids.

Since solubility is not a critical factor in drilling emulsion additives, any of the aforementioned classes of water and hydrocarbon soluble compositions would be satisfactory as inhibitors in drilling emulsions.

While all of the compositions of this invention are potent anti-microbiological agents, it is difficult to state the exact concentration of inhibitor required for protection. For example, factors such as the type of drilling mud, the microorganisms encountered in a particular locale, and drilling practice all determine the amount of inhibitor needed. However, in general, it is believed that a high degree of microbiological inhibition can ordinarily be obtained using from ¼ pound to 5 pounds per barrel of drilling mud with 1 to 2 pounds per barrel being a more average figure. Individual inhibitors or combinations of the inventive inhibitors may be effectively employed. The concentration of inhibitor or mixture of inhibitors needed is determined on a small sample. Then, substantial quantities of the inhibitors are introduced in powder or liquid form by introducing the inhibitor through a hopper and mixing with the drilling fluid as other drilling additives are added. Alternatively, the inhibitors may be added directly into the mud pit.

To determine the relative efficacy of the compositions of this invention as microbiological inhibitors of drilling muds, the "water loss" test is used. This test makes use of the empirical observation that the loss of water from the drilling fluid through the walls of the well is correlated to the microbiological degradation or fermentation of a starch-containing drilling fluid. The "water loss" procedure followed is the American Petroleum Institute (A.P.I.) Code 29 which is a standard field procedure for testing drilling fluids.

To specifically illustrate the inventive concept, the following non-limiting illustrative examples are set forth:

EXAMPLE I.—FORMULATION OF AQUEOUS BASE DRILLING FLUIDS

Synthetic drilling fluids are prepared by combining the following materials.

*Composition I*

| Component: | Parts by wt. |
|---|---|
| Attapulgite clay | 20,000 |
| Water | 280,000 |
| Sodium ortho phosphate | 10,000 |
| Hydrolyzed potato starch | 46,000 |

The materials are blended until an intimate viscous fluid is obtained.

Composition II

| Component: | Parts by wt. |
|---|---|
| Blue bentonite | 15,000 |
| Water | 300,000 |
| Sodium ortho phosphate | 7,500 |
| Carboxymethyl cellulose | 35,000 |

The materials are blended until an intimate viscous fluid is obtained.

Both fluids are aged for 24 hours before use.

EXAMPLE II.—ESTABLISHING WATER LOSS ON TREATED AND UNTREATED AQUEOUS DRILLING FLUID SOLUTIONS

Experimental

Samples of Compositions I and II from Example I are made up as follows:

A 30 ml. sample of each composition is treated with the inhibitor being tested so that concentrations of ½ pound, 1 pound, and 5 pounds of test chemical/barrel of drilling fluid are produced. A sample of each base mud composition is untreated for control purposes. 1 ml. of a soil suspension of a mixture of microbiological culture which had actually caused microbiological decay of drilling fluids is used to inoculate the three concentrations of treated drilling fluid as well as the untreated controls. The water loss for treated and untreated drilling fluid is determined upon starting the test and after 14 days.

Results

After 14 days the untreated controls average a water loss about 250% greater than that for the treated samples. The following additives used in accordance with the invention averaged about ⅕ of the water loss of the control.

1,2-dihydroxynaphthalene
1,8-dihydroxynaphthalene
2,6-dihydroxynaphthalene
1,6-dicarboxynaphthalene
1,8-dicarboxynaphthalene, disodium salt
2,6-dicarboxynaphthalene, didimethylamine salt
1,5-dicarboxynaphthalene, diammonium salt

EXAMPLE III.—FORMULATION OF OIL-BASED DRILLING FLUIDS

Synthetic oil-based drilling fluids are prepared as follows:

Composition I

A suspension of red lead in gas oil is prepared. Sufficient oleic acid is added to bring the viscosity (MacMichael) to 10°.

Composition II

| Component: | Parts by wt. |
|---|---|
| Sodium linoleate | 1 |
| Texas crude | 70 |
| Ground oyster shells | 20 |
| Blown asphaltic bitumen | 9 |

Both compositions are aged 24 hours before use.

EXAMPLE IV.—ESTABLISHING WATER LOSS ON TREATED AND UNTREATED OIL-BASED DRILLING FLUIDS

Experimental

The testing procedure of Example II is followed.

Results

The untreated controls water loss averaged about 225% greater than that for the treated samples.

The following additives used in accordance with the invention averaged about ⅕ of the water loss of the control.

1,2-dimethylnaphthalene
1,8-dimethylnaphthalene
1,6-dimethylnaphthalene
2,6-dimethylnaphthalene
1,2-dicarboxynaphthalene, dimethyl ester
1,8-dicarboxynaphthalene, dimethyl ester
1,6-diacetylnaphthalene
2,6-dihydroxymethylnaphthalene
6-formyl-2-naphthoic acid ethyl ester

EXAMPLE V.—FORMULATION OF EMULSION-BASED DRILLING FLUIDS

Synthetic drilling fluids are prepared as follows.

Composition I (oil in water emulsion)

| Component: | Parts by wt. |
|---|---|
| Granular petroleum asphalt | 50 |
| Diesel fuel oil | 10 |
| Sorbitan monooleate | 2 |
| Water | 32 |
| Bentonite | 6 |

The oil, asphaltic material, and emulsifying agent (sorbitan monooleate) are mixed and heated to 180° F. and blended for 30 minutes. The hot mixture is added to a suspension of the bentonite in water, and the entire mixture heated in an oven vessel at 140° C. with rapid blending until emulsification is complete.

Composition II (water in oil)

| Component: | Parts by wt. |
|---|---|
| Texas crude oil | 3000 |
| Water base mud | 2000 |
| Sodium salt of sulfated sperm oil | 10 |
| Calcium hydroxide | 3 |

The sulfated sperm oil is added to the oil phase under agitation. The calcium hydroxide is added to the oil phase. After 4 to 5 minutes of vigorous stirring, the mud phase is added.

The compositions are aged 24 hours before use.

EXAMPLE VI.—ESTABLISHING WATER LOSS ON TREATED AND UNTREATED EMULSION-BASED DRILLING FLUIDS

Experimental

The identical procedure set forth in Example II is followed.

Results

After 14 days, the untreated drilling fluids average water loss was about 325% greater than that for the treated samples.

The following additives used in accordance with this invention averaged about ⅕ of the water loss of the control.

(a) Water in oil emulsions:
  1,2-dimethylnaphthalenes
  1,8-dimethylnaphthalenes
  2,6-dimethylnaphthalenes
  1,6-dimethylnaphthalenes (b) Oil in water emulsions:
  2,6-dicarboxynaphthalene, disodium salt
  1,7-dicarboxynaphthalene, dimethylamine salt
  1,5-dicarboxynaphthalene, ammonium salt

We claim:

1. A well drilling fluid composition comprising a major amount of a drilling fluid comprised of an aqueous suspension of inorganic solids having admixed therein an organic gel-forming material which is susceptible to microbiological attack selected from the group consisting of starches, gums, and carboxyalkyl celluloses and a minor amount of a microbiological inhibiting additive of the structure

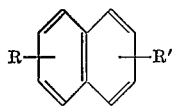

wherein R and R' are substituents selected from the group consisting of alkyl, hydroxyalkyl, alkoxy, formyl, hydroxy, carboxy, the alkyl esters of carboxy and the salts of carboxy, said inhibiting additive being present in sufficient amount to inhibit microbiological attack of the drilling fluid composition, said alkyl, alkoxy, carboxy, and hydroxyalkyl substituents having from 1 to 6 carbon atoms.

2. The composition of claim 1 wherein the microbiological inhibiting additive is a dicarboxynaphthalene.

3. The composition of claim 1 wherein the microbiological-inhibiting additive is hydroxynaphthoic acid.

4. In the art of drilling wells with well drilling fluid wherein there is circulated in the well a drilling fluid comprising an aqueous suspension of inorganic solids and an organic gel-forming material selected from the group consisting of starches, gums, and carboxyalkyl celluloses which is normally subject to microbiological attack, the improvement comprising treating said drilling fluid with a minor amount of a compound sufficient to inhibit said microbiological attack, said compound having the structure:

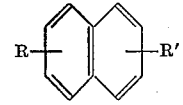

wherein R and R' are substituents selected from the group consisting of alkyl, hydroxyalkyl, alkoxy, formyl, hydroxy, carboxy, the alkyl esters of carboxy, and the salts of carboxy, said alkyl, alkoxy, carboxy, and hydroxyalkyl substituents having from 1 to 6 carbon atoms.

5. The method of claim 4 wherein the microorganism inhibiting composition is added subsequent to addition of the drilling fluid to the well.

References Cited by the Examiner

UNITED STATES PATENTS

| | | | |
|---|---|---|---|
| 2,417,307 | 3/1947 | Larsen | 252—8.5 |
| 2,734,861 | 2/1956 | Scott et al. | 252—8.5 |
| 2,815,323 | 12/1957 | Schneider | 252—8.5 |
| 2,908,597 | 10/1959 | Owen | 252—8.5 |
| 2,986,516 | 5/1961 | Reddie | 252—8.5 |

OTHER REFERENCES

Gregory: Uses and Applications of Chemicals and Related Materials, Reinhold Pub. Co., June 1939, page 400.

JULIUS GREENWALD, *Primary Examiner.*